US00RE37089E

(19) United States
(12) Reissued Patent
Jarvis et al.

(10) Patent Number: US RE37,089 E
(45) Date of Reissued Patent: Mar. 13, 2001

(54) REFINING PROCESS AND APPARATUS

(75) Inventors: David R. Jarvis, Coral Springs, FL (US); Ewert J. A. Wilson, Albany, KY (US)

(73) Assignee: Millennium Fuels USA LLC, Richardson, TX (US)

(21) Appl. No.: 09/387,431

(22) Filed: Aug. 31, 1999

Related U.S. Patent Documents

Reissue of:
(64) Patent No.: 5,679,117
Issued: Oct. 21, 1997
Appl. No.: 08/734,091
Filed: Oct. 21, 1996

U.S. Applications:

(63) Continuation-in-part of application No. 08/605,282, filed on Feb. 8, 1996, now abandoned, which is a continuation-in-part of application No. 08/430,275, filed on Apr. 28, 1995, now abandoned, which is a continuation-in-part of application No. 08/385,466, filed on Feb. 8, 1995, now abandoned.

(51) Int. Cl.[7] ..... C10L 1/18
(52) U.S. Cl. ..... 44/451; 585/1; 585/302
(58) Field of Search ..... 44/451; 585/1, 585/302

(56) References Cited

U.S. PATENT DOCUMENTS

| | | |
|---|---|---|
| 1,858,822 | 5/1932 | Frolich . |
| 1,878,170 | 9/1932 | Naiman et al. . |
| 2,012,199 | 8/1935 | McElroy . |
| 2,365,009 | 12/1944 | Robertson . |
| 2,781,324 | 2/1957 | Haensel . |
| 3,755,144 | 8/1973 | Asselin . |
| 4,058,576 | 11/1977 | Chang et al. . |
| 4,243,493 | 1/1981 | Gruber et al. . |
| 4,296,262 | 10/1981 | Grane et al. . |
| 4,296,263 | 10/1981 | Worrell . |
| 4,297,172 | 10/1981 | Kyle . |
| 4,304,948 | 12/1981 | Vora et al. . |
| 4,393,259 | 7/1983 | Ward et al. . |
| 4,403,999 | 9/1983 | Bezman . |
| 4,444,988 | 4/1984 | Capsuto et al. . |

(List continued on next page.)

FOREIGN PATENT DOCUMENTS

| | | |
|---|---|---|
| 0 227 176 | 7/1987 | (EP) . |
| WO 90/12854 | 11/1990 | (WO) . |

*Primary Examiner*—Jacqueline V. Howard
(74) *Attorney, Agent, or Firm*—Luedeka Neely & Graham PC

(57) ABSTRACT

A process of producing high octane hydrocarbons includes the steps of preparing a mixture of substantially ethanol and butane or natural gasoline, or low octane gasoline, the mixture having room temperature and atmospheric pressure, adjusting the pressure of the mixture to a magnitude within the range of 10 to 50 pounds per square inch, adjusting the temperature of the mixture to a magnitude within the range of 100 to 460 degrees Fahrenheit, adjusting the pressure of the mixture to a pressure within the range of 500 to 1000 [hydrocarbons] pounds per square inch, catalyzing the mixture with a platinum catalyst, lowering the temperature of the mixture to a magnitude within a range of 90 to 190 degrees Fahrenheit, and separating out liquid product and gas from the mixture. An apparatus for producing high octane alcohols includes a starting tank for retaining a mixture of substantially ethanol and butane or natural gasoline, or low octane gasoline, a heat exchanger for raising the temperature of the mixture, a first high pressure conduit extending from the starting tank to the heat exchanger, a catalyzing chamber, second and third high pressure conduits extending from the heat exchanger to the catalyzing chamber, a nozzle interconnecting the second and third high pressure conduits, high pressure pumps for extracting the heated mixture from the heat exchanger and delivering the mixture to the catalyzing chamber through the second and third high pressure conduits, and a separator for precipitating liquid product out of the mixture.

26 Claims, 1 Drawing Sheet

U.S. PATENT DOCUMENTS

| | | |
|---|---|---|
| 4,447,653 | 5/1984 | Vora . |
| 4,788,365 | 11/1988 | Harandi et al. . |
| 4,826,507 | 5/1989 | Harandi et al. . |
| 4,830,635 | 5/1989 | Harandi et al. . |
| 4,868,342 | 9/1989 | Verson . |
| 4,981,491 | 1/1991 | Harandi et al. . |
| 5,017,731 | 5/1991 | Gesser et al. . |
| 5,024,679 | 6/1991 | Harandi et al. . |
| 5,093,533 | 3/1992 | Wilson . |
| 5,141,525 | 8/1992 | Stiiwe et al. . |
| 5,171,912 | 12/1992 | Harandi . |
| 5,310,954 | 5/1994 | Hiles et al. . |
| 5,348,707 | 9/1994 | Harandi et al. . |
| 5,395,981 | 3/1995 | Marker . |
| 5,559,275 | 9/1996 | Barger . |
| 5,648,589 | 7/1997 | Soled et al. . |
| 5,672,795 | 9/1997 | Vora et al. . |
| 5,714,662 | 2/1998 | Vora et al. . |
| 5,763,732 | 6/1998 | Mariette et al. . |
| 5,811,627 | 9/1998 | Welsh . |

REFINING PROCESS AND APPARATUS

Matter enclosed in heavy brackets [ ] appears in the original patent but forms no part of this reissue specification; matter printed in italics indicates the additions made by reissue.

The present invention is a *reissue of Ser. No. 08/734,891 filed Oct. 21, 1996, U.S. Pat. No. 5,679,117 which is a* continuation-in-part of Ser. No. 08/605,282, filed Feb. 8, 1996, now abandoned, which is a continuation-in-part of Ser. No. 08/430,275 filed Apr. 28, 1995, now abandoned, which is a continuation-in-part of Ser. No. 08/385,466, Feb. 8, 1995, now abandoned.

FIELD OF THE INVENTION

The present invention relates generally to the field of fuel forming processes. More specifically it relates to a process of producing high octane alcohols, or pump gasoline, including the steps of placing a pre-mixed mixture of ethanol [and] and other alcohols, and butane or natural gasoline or straight run gasoline in a starting tank, raising the pressure of gases above the surface of the mixture to fifty pounds per square inch, pumping the mixture from the bottom of the starting tank through a first high pressure conduit into a heat exchanger where the temperature of the mixture is raised to a magnitude within the range of 100 to 460 degrees Fahrenheit, extracting the heated mixture from the heat exchanger with high pressure pumps which raise the mixture pressure to 500 to 1000 pounds per square inch, and feeding the heated and pressurized mixture through a second high pressure conduit through a nozzle and through a third high pressure conduit into an elongate catalyzing chamber containing a platinum catalyst. Additional steps include delivering the catalyzed mixture through a fourth high pressure conduit into a cooler for lowering the temperature to a magnitude within a range of 90 to 190 degrees Fahrenheit, feeding the cooled mixture through a fifth high pressure conduit into a series of separator tanks in which liquid final product collects in the tank bottoms and gas rises within the tanks above the surface of the liquid, and the liquid is drained off as the final product. The final product is 120 to 160 research octane, 110 to 129 motor octane, and [R & M] $(R+M)/2$ about 148. In the case where low octane gasoline (straight run gasoline) is used as the starting material, the final product is a substantially higher octane gasoline called pump gasoline. In general, the starting material may be low octane hydrocarbon material, and the final product is higher octane hydrocarbon material.

BACKGROUND OF THE INVENTION

There have long been various chemical processes for producing gasoline and other fuels. A problem with these prior processes has been that they either fail to produce high octane gasoline, or they fail to do so efficiently.

These prior processes include that of Harandi, U.S. Pat. No. 5,171,912, issued on Dec. 15, 1992. Harandi discloses a process for the production of C+ gasoline from n-butane and propane. The Harandi process includes the steps of contacting a fresh feedstream including normal butane with shape selective medium pore zeolite catalyst particles under conditions sufficient to convert n-butane to an effluent stream including C+ alkanes; separating the effluent stream in a fractionator to recover an overhead stream including propane; contacting the propane stream and a fresh propane feedstream with shape selective, medium pore zeolite catalyst particles under conversion conditions sufficient to convert propane to a mixture including C+ alkanes; deethanizing the mixture and passing the deethanized product including C+ alkanes to the fractionator for separation concurrent with the effluent stream; recovering a bottom stream including C+ gasoline from the fractionator; preferably, distilling an intermediate stream including C alkanes from the fractionator and recovering a stream including isobutane and a stream including unconverted normal butane; and recycling the unconverted normal butane to the normal butane feedstream to the integrated process.

Ward, et al., U.S. Pat. No. 4,393,259, issued on Jul. 12, 1983, reveals a process for converting propane or butane to gasoline. The Ward, et al. process includes the steps of passing feed hydrocarbon into a dehydrogenation zone; passing the entire dehydrogenation zone effluent including hydrogen and light by-products into a catalytic condensation zone where the resulting olefins are converted into dimers and trimers; passing the condensation zone effluent stream into a separation zone in which the dimers and trimers are concentrated into a product stream, with unconverted feed hydrocarbon and hydrogen being recycled to the dehydrogenation zone.

Vora, et al., U.S. Pat. No. 4,304,948, issued on Dec. 8, 1981, teaches a multi-step hydrocarbon conversion process for converting butane to gasoline. The process includes the steps of passing butane into a dehydrogenation zone and the entire dehydrogenation zone effluent is then passed into a catalytic condensation zone where butylene is converted into C and C hydrocarbons; commingling and separating the condensation zone effluent, a stripper overhead stream and an absorber bottoms stream into vapor and liquid portions; passing the liquid into the stripper and contacting the vapor portion with stripper bottoms liquid in an absorber; contacting the absorber overhead stream with liquid butane in a second absorber to remove C hydrocarbons and recycling the dehydrogenation zone; and debutanizing a portion of the stripper bottoms to yield the liquid butane and a gasoline product.

Capsuto, et al., U.S. Pat. No. 4,444,988, issued on Apr. 24, 1984, discloses the use of liquefied propane and butane or butane recycled to control the heat of reaction of converting olefins to gasoline and distillate. The Capsuto, et al. process uses beds and separates the effluent product from the beds into a gas in a liquid phase, cools the gas phase to form additional liquid and heat exchanges the liquid with the overhead gas from the separator.

Wilson, U.S. Pat. No. 5,093,533, issued on Mar. 3, 1992, reveals blended gasolines and a process for making the blended gasolines. The Wilson process involves mixing of a butane-pentane rich component, and natural gasoline component, and at least one octane-enhancing component. The mix is weathered during the blending operation to remove light-weight hydrocarbons including two, three and four-carbon components.

Hiles, et al., U.S. Pat. No. 5,310,954, issued on May 10, 1994, discloses a process for preparing tetrahydrofuran. The Hiles et al. process separates tetrahydrofuran from a feed mixture containing water, lower alkanol and tetrahydrofuran, which includes distilling the mixture in a first distillation zone at a first pressure; recovering from an upper part of the distillation zone a first vaporous mixture including water, lower alkanol and tetrahydrofuran; subjecting the material from the first vaporous mixture to condensation conditions in a condensation zone; passing condensate from the condensation zone to a second distillation zone operated at a second pressure higher than the first pressure;

recovering from an upper part of the second distillation zone a second vaporous mixture including water, lower alkanol and tetrahydrofuran that has a lower concentration of tetrahydrofuran than the first vaporous mixture; and recovering from a lower part of the second distillation zone a stream including substantially pure tetrahydrofuran.

It is thus an object of the present invention to provide a process of producing a very high octane alcohol product efficiently.

It is another object of the present invention to provide such a process which can be practiced with conventional heat exchanger and separator tank equipment.

It is still another object of the present invention to provide such a process which is safe to practice.

It is finally an object of the present invention to provide such a process which is inexpensive to practice.

SUMMARY OF THE INVENTION

The present invention accomplishes the above-stated objectives, as well as others, as may be determined by a fair reading and interpretation of the entire specification.

A process of producing high octane hydrocarbon material is provided, including the steps of preparing a mixture of substantially ethanol and butane or natural gasoline, or straight run gasoline, the mixture having a room temperature and [a] an atmospheric pressure, adjusting the pressure of the mixture to a magnitude within the range of 10 to 50 pounds per square inch, adjusting the temperature of the mixture to a magnitude within the range of 100 to 460 degrees Fahrenheit, adjusting the pressure of the mixture to a pressure within the range of 500 to 1000 pounds per square inch, catalyzing the mixture with a platinum catalyst, lowering the temperature of the mixture to a magnitude within a range of and gas from the mixture, and separating out liquid product and gas from the mixture. The process preferably includes the additional steps of delivering a quantity of gas separated from the liquid product into a furnace to supply heat required for the process, and the further additional steps of delivering a quantity of the gas separated from the liquid product into the mixture at the initial step of the process. The separating step preferably includes several separation steps of separating the mixture into liquid product and gas.

An apparatus for producing high octane alcohols is also provided, including a starting tank for retaining a mixture of substantially ethanol and butane or natural gasoline, a heat exchanger for raising the temperature of the mixture, a first high pressure conduit extending from the starting tank to the heat exchanger, a catalyzing chamber, second and third high pressure conduits extending from the heat exchanger to the catalyzing chamber, a nozzle interconnecting the second and third high pressure conduits, high pressure pumps for extracting the heated mixture from the heat exchanger and delivering the mixture to the catalyzing chamber through the second and third high pressure conduits, and a separator for precipitating liquid product out of the mixture.

The catalyzing chamber preferably includes several upright tubular segments, each tubular segment having a top portion and a bottom portion and containing the platinum catalyst, interconnection conduits interconnecting the tubular segments alternatingly across the top and bottom portions of the tubular segments, a baffle plate within at least one of the tubular segments, the baffle plate having several plate ports. The tubular segments each preferably include one baffle plate positioned within and across the top portion and the bottom portion of the tubular segment.

BRIEF DESCRIPTION OF THE DRAWINGS

Various other objects, advantages and features of the invention will become apparent to those skilled in the art from the following discussion taken in conjunction with the following drawings, in which.

DETAILED DESCRIPTION OF THE PREFERRED EMBODIMENTS

Figure 1:
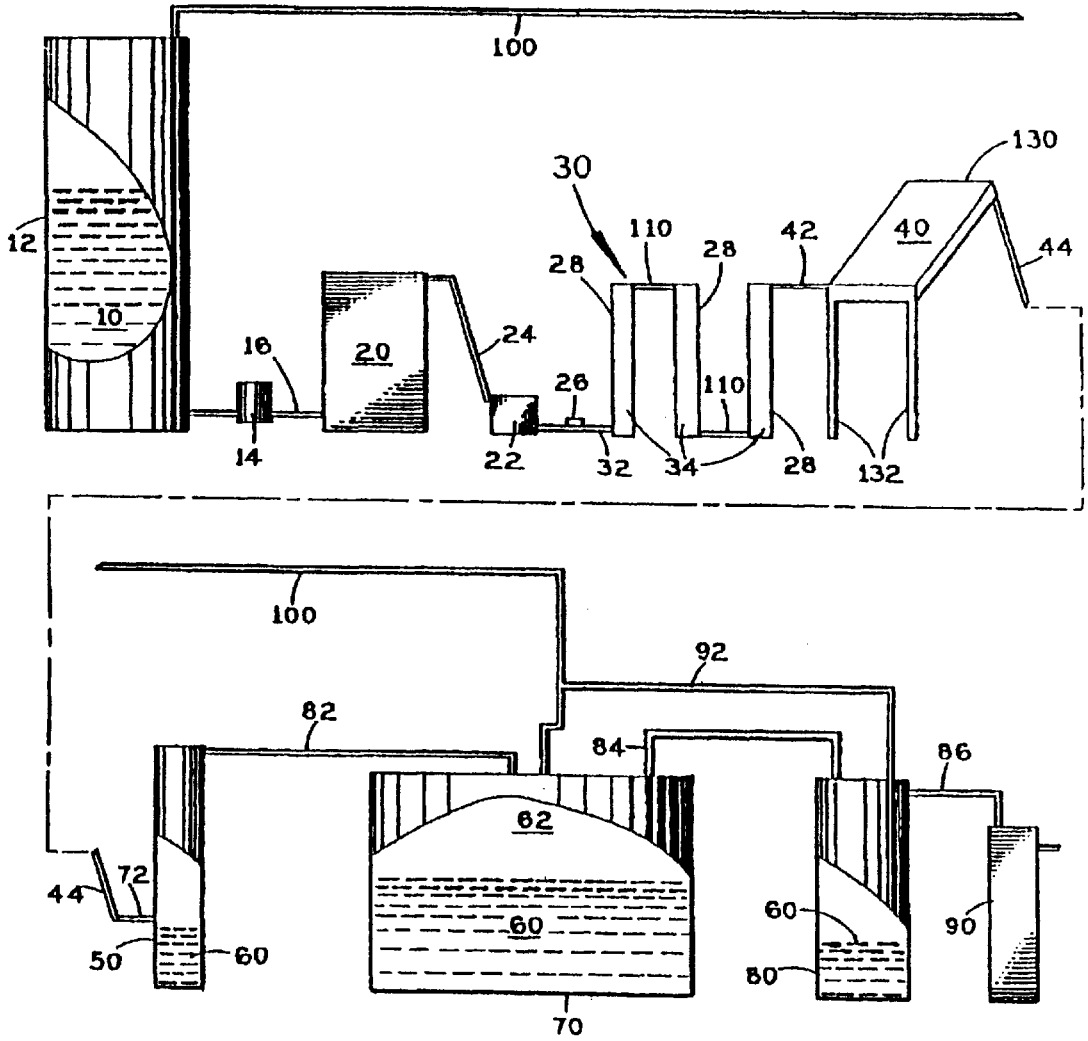
FIG. 1 is a semi-schematic view of the preferred apparatus for carrying out each step of the inventive process.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Process

Referring to FIG. 1, a process of producing high octane alcohols is disclosed, including the following steps. A premixed mixture 10 of one third ethanol and two thirds butane at room temperature and atmospheric pressure is placed in a starting tank 12. The pressure of gases above the surface of the mixture 10 is raised to fifty pounds per square inch. The mixture 10 is pumped with pumps 14 from the bottom of starting tank 12 through a first high pressure conduit 16 into a heat exchanger 20, where the temperature of mixture 10 is raised to a level within the range of 100 to 460 degrees Fahrenheit. The preferred temperature is 225 degrees Fahrenheit. The heated mixture 10 is extracted from the heat exchanger 20 with high pressure pumps 22, which raise mixture 10 pressure to a level within the range of 500 to 1000 pounds per square inch. The preferred pressure is 600 pounds per square inch. The heated and pressurized mixture 10 is fed through a second high pressure conduit 24, through a nozzle 26 and through a third high pressure conduit 32 into an elongated catalyzing chamber 30 containing a platinum catalyst 34. Chamber 30 includes three interconnected upright segments 28. The catalyzed mixture 10 is delivered through a fourth high pressure conduit 42 into a cooler 40 for lowering the mixture 10 temperature to a level within a range of 90 to 190 degrees Fahrenheit.

The cooled mixture 10 is fed through a fifth high pressure conduit 44 into a first separator tank 50 in which final liquid product 60 collects in the bottom of first separator tank 50 and gas 62 rises to fill a space within tank 50 above the surface of liquid product 60. The liquid product 60 is fed through a first separated liquid conduit 72 at the bottom of tank 50 and the gas 62 is drained off through a first separated gas conduit 82 at the top of tank 50. Both liquid product 60 and gas 62 are delivered into a second separator tank 70, in which more liquid product 60 is separated. Some of gas 62 within second separator tank 70 is delivered back through a feedback conduit 100 into the top of starting tank 12. Some of gas 62 within the second separator tank 70 is simultaneously delivered through a second separated gas conduit 84 into a third separator tank 80 where still more liquid product 60 precipitates out and gathers in the bottom of third separator tank 80. Some of gas 62 within third separator tank 80 is drained into a feedback conduit branch 92. Some of gas 62 within third separator tank 80 is delivered through a third separated gas conduit 86 into a furnace 90, where gas 62 is burned as fuel to supply heat to the process where needed.

Final liquid product 60 is within the range of 120 to 160 research octane, 110 to 129 motor octane, and about 148 [R and M] $(R+M)/2$. Other final product 60 test data are as follows:

| | | |
|---|---|---|
| Oxygenates | I. V. % | 42.75 |
| MTBE | I. V. % | <0.1 |
| TAME | I. V. % | <0.1 |
| Alcohols (Ethanols) | I. V. % | 42.75 |
| G. C. Breakdown | Wt % | Vol % |
| N. Butane | 45.60 | 53.03 |
| ISO Pentane | 1.42 | 1.55 |
| N. Pentane | 1.02 | 1.10 |
| Toluene | 2.02 | 1.57 |
| Ethanol | 49.94 | 42.75 |
| PONA | Vol % | |
| Paraffins | 55.68 | |
| Olefins | 0.01 | |
| Naphthenes | <0.01 | |
| Aromatics | 1.57 | |

To produce high octane gasoline, add 20% by volume of the new product to 80 octane gasoline. The resulting mixture is 92.8 octane, with a vapor pressure in the range of 4 to 19 pounds per square inch.

Preferred Embodiments of Apparatus

Referring to FIG. 1, a preferred apparatus is disclosed for practicing the above-described process of producing high octane alcohols. This apparatus is merely exemplary and other forms of apparatus are contemplated.

Figure 2:
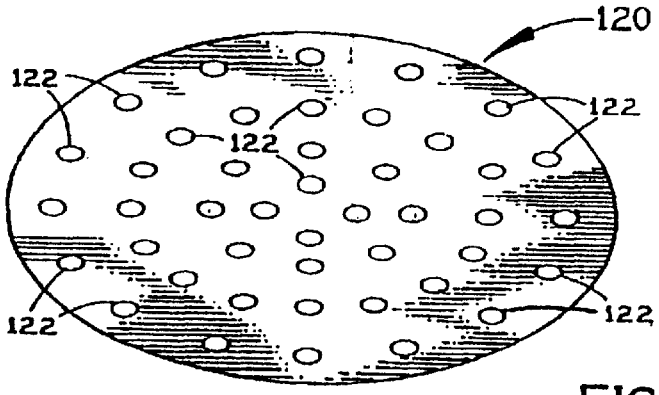
FIG. 2 is a perspective view of the baffle plate for use in the catalyzing chamber tubular segments.

Starting tank 12 is a vertical cylindrical drum. Heat exchanger 20 and pumps 14 and 22 are of any suitable conventional design. Nozzle 26 is preferably about three eights inches diameter. Catalyzing chamber 30 includes three elongate, upright tubular segments 28, each containing platinum catalyst 34. Segments 28 are interconnected by interconnection conduits 110, across the tops of the first and second segments 28 and across the bottoms of second and third segments 28. A baffle plate 120 having a plurality of ports 122 is positioned across the top and bottom of each segment 28. See FIG. 2. Cooler 40 preferably includes a substantially horizontal tray 130 elevated on legs 132. Separator tanks 50, 70 and 80 are vertical cylindrical drums. Tank 70 is preferably of substantially larger diameter than tanks 50 and 80.

Another embodiment of the invention uses as a starting material approximately one third ethanol mixed with two thirds natural gasoline. The process and apparatus for treating this mixture is the same as that previously described and this explanation will not be repeated herin. Natural gasoline is essentially a mixture of butanes and pentanes plus other hydrocarbon materials. Natural gasoline is derived from wet gas by stripping it. An example of natural gasoline is as follows:

C6+ . . . 53.871% by liquid volume
Butane . . . 3.03% by liquid volume
Neo-pentane . . . 0.697% of liquid volume
Iso-pentane . . . 26.046% by liquid volume
Normal pentane . . . 16.349% by liquid volume.

The resulting product is substantially one half natural gasoline and one half ethanol. It has a vapor pressure of 1.5 to 8.0 psi and an octane rating of 108 to 160.

A further embodiment uses as a starting material a mixture of 10% ethanol and 90% natural gasoline. The process steps and apparatus remain the same. The resulting product showed an increase in octane rating from 72 to 80–100.

It has been found that the starting material may contain 5% to 50% ethanol, and 50% to 95% natural gasoline. It is possible to add to the mixture 3% to 40% butane. The resulting product contains 5–50% ethanol, 50–90% natural gasoline including 3% to 50% hydrocarbons, and a trace of aromatics. The resulting product has a higher octane rating than the starting material. The product has an acceptable vapor pressure. This product appears to be a gasoline grade product. The ethanol can be removed without harming the product.

In the first embodiment, pentane, including iso-pentane, may be substituted for butane in the starting material. In another embodiment, the [starting] *hydrocarbon* material [is] *contains* a low octane hydrocarbon material known as light gasoline or straight run gasoline having an octane rating in the vicinity of 65 to 70. This material is processed through the apparatus described above and in the same way as described in connection with the first and further embodiments. One additional option is to inject a small amount of hydrogen in the catalyst bed. It has been found that the process increases the octane rating of the hydrocarbon material to a level in the vicinity of 87, such that the final product is pump gasoline. The final product has a vapor pressure in the range from 6 to 8 psi which is an acceptable range.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A process of producing *a* high octane [alcohols] *alcohol composition*, comprising the steps of:

preparing a mixture of *ethanol and* low octane hydrocarbon material, [having an octane rating in the vicinity of 65 and 70, said mixture having room temperature and atmospheric pressure, adjusting said pressure of said mixture to magnitude within the range of 10 to 50 pounds per square inch, adjusting said temperature of said mixture to a magnitude within the range of 100 to 460 degrees Fahrenheit, adjusting the pressure of said mixture to a pressure within the range of 500 to 1000 pounds per square inch] *said hydrocarbon material being selected from the group consisting of butane, natural gasoline, straight run gasoline, light gasoline, pentane, iso-pentane and a mixture of two or more of the foregoing*, catalyzing said mixture with a platinum catalyst *by conducting said mixture through a catalyst bed at an elevated pressure and elevated temperature which are sufficient to produce a catalyzed mixture containing the high octane alcohol composition*, lowering the temperature of said *catalyzed* mixture to a [magnitude] *temperature* within a range of *from about* 90 to *about* 190 degrees Fahrenheit, separating [out liquid product and] gas from said *catalyzed* mixture *to provide the high octane alcohol composition*.

2. A process according to claim 1, comprising the additional step of:

delivering a quantity of said gas separated from said [liquid product] *catalyzed mixture* into furnace means to supply heat required for said process.

3. A process according to claim 1, comprising the additional steps of:

delivering a quantity of said gas separated from said [liquid product] *catalyzed mixture* into said mixture [at the initial step of said process] *before the catalyzing step of said process*.

4. A process according to claim 1, wherein said separating step comprises a plurality of separation steps of separating said *catalyzed* mixture into liquid product and gas.

5. A [method] *process* according to claim 1, wherein said [hydrocarbons comprise] *hydrocarbon material comprises* butane.

6. A [method] *process* according to claim 1, wherein said [hydrocarbons comprise] *hydrocarbon material comprises* natural gasoline.

7. A [method] *process* according to claim 1, wherein said [hydrocarbons comprise] *hydrocarbon material comprises* straight run gasoline.

*8. A process according to claim 1, wherein said mixture comprises from about 5 to about 50% ethanol and from about 50 to about 95% said low octane hydrocarbon material.*

*9. A process according to claim 8, wherein said hydrocarbon material comprises natural gasoline.*

*10. A process according to claim 9, wherein said hydrocarbon material further comprises from about 3 to about 40% butane.*

*11. A process according to claim 1, wherein said mixture comprises about one third ethanol and about two thirds natural gasoline.*

*12. A process according to claim 1, wherein said mixture comprises about 10% ethanol and 90% natural gasoline.*

*13. A process according to claim 1, wherein said catalyzing step is conducted at a temperature ranging from about 100° to about 460° F.*

*14. A process according to claim 13, wherein said catalyzing step is conducted at a pressure ranging from about 500 to about 1000 pounds per square inch.*

*15. A process according to claim 1, further comprising injecting hydrogen into said catalyst bed during said catalyzing step.*

*16. A process according to claim 1, wherein said high octane alcohol composition has a research octane rating ranging from about 108 to about 160 and a vapor pressure ranging from about 1.5 to about 8 psi.*

*17. A high octane fuel composition comprising a mixture of relatively low octane fuel and relatively high octane alcohol composition, said relatively high octane alcohol composition being made by a process comprising the steps of:*

*mixing ethanol and a hydrocarbon material selected from the group consisting of butane, natural gasoline, straight run gasoline, light gasoline, pentane, isopentane and a mixture of two or more of the foregoing,*

*catalyzing said mixture at a temperature of at least about 100° F. and a pressure of at least about 500 pounds per square inch to produce a catalyzed mixture containing a relatively high octane alcohol composition,*

*lowering the temperature of said catalyzed mixture to a temperature within a range of from about 90° to about 190° F.,*

*separating gas from said catalyzed mixture to provide the high octane fuel composition.*

*18. The fuel composition of claim 17, wherein said hydrocarbon material comprises butane.*

*19. The fuel composition of claim 17, wherein said hydrocarbon material comprises natural gasoline.*

*20. The fuel composition of claim 17, wherein said hydrocarbon material comprises straight run gasoline.*

*21. The fuel composition of claim 17, wherein said mixture comprises from about 5 to about 50% ethanol and from about 50 to about 95% hydrocarbon material.*

*22. The fuel composition of claim 17, wherein said catalyzing step is conducted at a temperature ranging from about 100° to about 460° F.*

*23. The fuel composition of claim 17, wherein said catalyzing step is conducted at a pressure ranging from about 500 to about 1000 pounds per square inch.*

*24. The fuel composition of claim 17 wherein hydrogen is injected into said catalyst bed during said catalyzing step.*

*25. The fuel composition of claim 17 wherein said fuel composition has a vapor pressure ranging from about 4 to about 19 psi.*

*26. The fuel composition of claim 17 wherein said high octane alcohol composition has a research octane rating ranging from about 108 to about 160 and a vapor pressure ranging from about 1.5 to about 8 psi.*

* * * * *